(12) United States Patent
Yoon

(10) Patent No.: US 12,427,917 B2
(45) Date of Patent: Sep. 30, 2025

(54) LIGHTING APPARATUS FOR VEHICLE AND MANUFACTURING METHOD THEREOF

(71) Applicant: HYUNDAI MOBIS CO., LTD., Seoul (KR)

(72) Inventor: Tae Kyoung Yoon, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/742,289

(22) Filed: Jun. 13, 2024

(65) Prior Publication Data
US 2025/0074302 A1  Mar. 6, 2025

(30) Foreign Application Priority Data
Sep. 5, 2023 (KR) .................. 10-2023-0117673

(51) Int. Cl.
| | | |
|---|---|---|
| *B60Q 3/62* | (2017.01) | |
| *B60Q 3/14* | (2017.01) | |
| *B60Q 3/16* | (2017.01) | |
| *F21V 8/00* | (2006.01) | |

(52) U.S. Cl.
CPC ............... *B60Q 3/62* (2017.02); *B60Q 3/14* (2017.02); *B60Q 3/16* (2017.02); *G02B 6/0065* (2013.01); *G02B 6/0073* (2013.01)

(58) Field of Classification Search
CPC ...... B60Q 3/62; F21Y 2115/10; G02B 6/0073
See application file for complete search history.

(56) References Cited

U.S. PATENT DOCUMENTS

2012/0120681 A1* 5/2012 Yamasaki ............ G03B 15/04
                                                    362/311.01
2015/0362658 A1   12/2015 Lee

FOREIGN PATENT DOCUMENTS

EP  3 848 628 A1  7/2021
FR  2 957 724 A1  9/2011

OTHER PUBLICATIONS

Extended European Search Report issued on Dec. 10, 2024 in European Patent Application No. 24183104.9.

* cited by examiner

*Primary Examiner* — Robert J May
(74) *Attorney, Agent, or Firm* — Morgan, Lewis & Bockius LLP

(57) ABSTRACT

A lighting apparatus for a vehicle, the lighting apparatus including: a rear panel; a printed circuit board (PCB) disposed in front of the rear panel and including a plurality of lighting sources; a rubber pad disposed in front of the PCB and configured to a plurality of through-holes formed based on positions of the plurality of lighting sources; a front panel snap-fitted to the rear panel; and a light guide member coupled to an accommodating space formed between a plurality of first buttons and a plurality of second buttons disposed on the front panel, wherein the light guide member includes a transmission member through which light emitted from the plurality of lighting sources transmits and a shielding member shielding the light.

9 Claims, 4 Drawing Sheets

LIGHTING APPARATUS FOR VEHICLE AND MANUFACTURING METHOD THEREOF

CROSS-REFERENCE TO RELATED APPLICATION

The present application claims the benefit under 35 USC § 119 (a) of Patent Application No. 10-2023-0117673, filed on Sep. 5, 2023, in Korea, the entire disclosure of which is incorporated herein by reference for all purposes.

TECHNICAL FIELD

The present disclosure relates to a lighting apparatus for a vehicle and a manufacturing method thereof.

BACKGROUND

The content described in this section simply provides background information for the present disclosure and does not constitute prior art.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

To improve the interior emotional quality of a vehicle, plating or metal deposition is applied to decoration parts. For example, in the case of plating a decoration part, a glossy surface of a metal may be expressed during the day, while light does not pass through the decoration part at night. When metal is deposited on a decoration part, the decoration part expresses a glossy surface of the metal during the day and allows light to pass through the decoration part at night.

However, a decoration part that requires night lighting has structural limitations in that the decoration part emit light as a whole. Therefore, if a design that requires lighting only in a partial area of the decoration part is required, the design cannot be implemented.

SUMMARY

In view of the above, the present disclosure provides a lighting apparatus for a vehicle, capable of implementing partial illumination in a partial section of a decoration part that requires night lighting.

The present disclosure also provides a lighting apparatus for a vehicle, capable of expressing a glossy surface of metal during the day and illuminating only a partial area at night.

The present disclosure also provides a lighting apparatus for a vehicle, capable of reducing the number of parts and manufacturing costs by using double-injection molding.

The present disclosure also provides a lighting apparatus for a vehicle, which may be located in various positions inside a vehicle to increase emotional quality of the interior.

The problems to be solved by the present disclosure are not limited to the problems mentioned above, and other problems not mentioned may be clearly understood by those skilled in the art from the description below.

Advantageous Effects

According to an embodiment, the lighting apparatus for a vehicle may implement partial illumination in a partial section of a decoration part that requires night lighting.

According to an embodiment, the lighting apparatus for a vehicle may express a glossy surface of metal during the day and illuminate only a partial area at night.

According to an embodiment, the lighting apparatus for a vehicle may reduce the number of parts and manufacturing costs by using double-injection molding.

According to an embodiment, the lighting apparatus for a vehicle may be located in various positions inside a vehicle to increase emotional quality of the interior.

DETAILED DESCRIPTION

The description of the present disclosure to be disclosed below along with the accompanying drawings is intended to illustrate embodiments of the present disclosure and is not intended to represent the only embodiment in which the present disclosure may be practiced.

Figure 1:
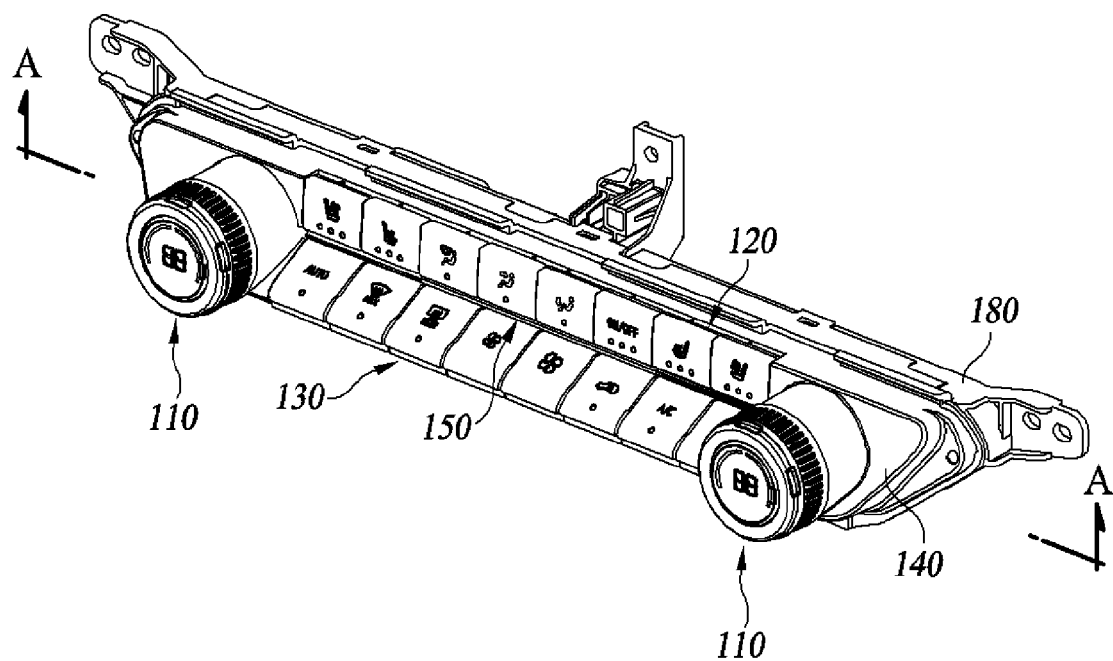
FIG. 1 is a perspective view schematically illustrating a configuration of a lighting apparatus for a vehicle according to an embodiment of the present disclosure.

FIG. 1 is a perspective view schematically illustrating a configuration of a lighting apparatus for a vehicle according to an embodiment of the present disclosure.

Figure 2:
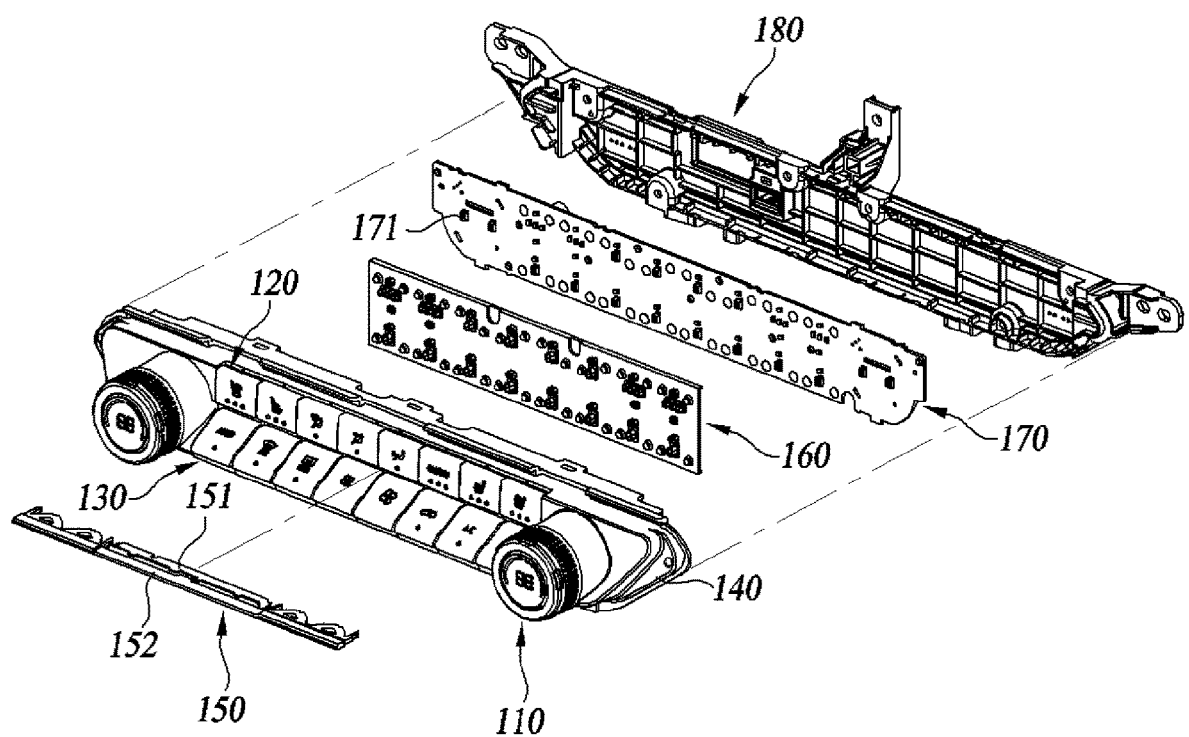
FIG. 2 is an exploded perspective view illustrating a configuration of a lighting apparatus for a vehicle according to an embodiment of the present disclosure.

FIG. 2 is an exploded perspective view illustrating a configuration of a lighting apparatus for a vehicle according to an embodiment of the present disclosure.

Referring to FIGS. 1 and 2, a lighting apparatus for a vehicle includes some or all of a front panel 140, a light guide member 150, a rubber pad 160, a printed circuit board (PCB) 170, and a rear panel 180.

The front panel 140 includes a plurality of first buttons 120 and a plurality of second buttons 130. The plurality of first buttons 120 may be push buttons. The plurality of first buttons 120 are aligned and arranged in a longitudinal direction of the front panel 140. The plurality of second buttons 130 are aligned and arranged at the bottom of the plurality of aligned first buttons 120. Here, the plurality of second buttons 130 may be toggle buttons.

Button knobs 110 are disposed on both ends of the front panel 140. The button knob 110 may be clicked by a user to be turned on/off. The button knob 110 may be rotated by the user to adjust the volume of media, etc.

The light guide member 150 according to an embodiment of the present disclosure is disposed between the plurality of first buttons 120 and the plurality of second buttons 130. The light guide member 150 has a predetermined size and thickness to be disposed in a local area.

The light guide member 150 includes a transmission member 151 and a shielding member 152.

The light guide member 150 is manufactured based on double injection molding. For example, the transmission member 151 is injection-molded based on primary injection molding to be manufactured. The shielding member 152 is injection-molded in front of the transmission member 151 based on secondary injection molding to be manufactured.

The light guide member 150 is manufactured based on double injection molding, and then metal formed of chrome is deposited based on a thin film processing process. Here, the thin film processing process includes a physical vapor deposition (PVD) process.

The PCB 170 includes a plurality of lighting sources 171. Here, the plurality of lighting sources 171 may be light emitting diodes (LEDs). Here, the plurality of lighting sources 171 are arranged on an upper surface of the PCB 170. A plurality of lighting sources 171 may be arranged on the upper surface of the PCB 170 based on a predetermined pattern.

The transmission member 151 may be injection-molded based on the shape of an injection mold. The transmission member 151 according to an embodiment of the present disclosure may have a shape with a predetermined thickness so that the transmission member 151 may be disposed between the plurality of first buttons 120 and the plurality of second buttons 130. The transmission member 151 may transmit light emitted from the plurality of lighting sources 171 to the front.

The shielding member 152 shields light transmitted from the transmission member 151 to form an illuminated area and a non-illuminated area of the light guide member 150. Accordingly, the shielding member 152 has a shape corresponding to a front area of the transmission member 151. The shielding member 152 is manufactured in a shape in which a partial area is open so that a portion of light passing through the transmission member 151 may be irradiated forwardly.

When the light guide member 150 is disposed between the plurality of first buttons 120 and the plurality of second buttons 130, the shielding member 152 is coupled in a state exposed to the front. Accordingly, a thin film formed of metal may be deposited on the shielding member 152 to have a glossy surface during the day. A thin film formed of, for example, chrome, is formed on the shielding member 152 according to an embodiment of the present disclosure. However, the material deposited on the shielding member 152 is not limited thereto.

The rubber pad 160 is disposed in front of the PCB 170. The rubber pad 160 includes a through-hole (not shown). The through-hole of the rubber pad 160 is formed based on the position of each of the plurality of lighting sources 171 arranged on the PCB 170.

The rubber pad 160 may dissipate heat generated by the plurality of lighting sources 171.

Figure 3:
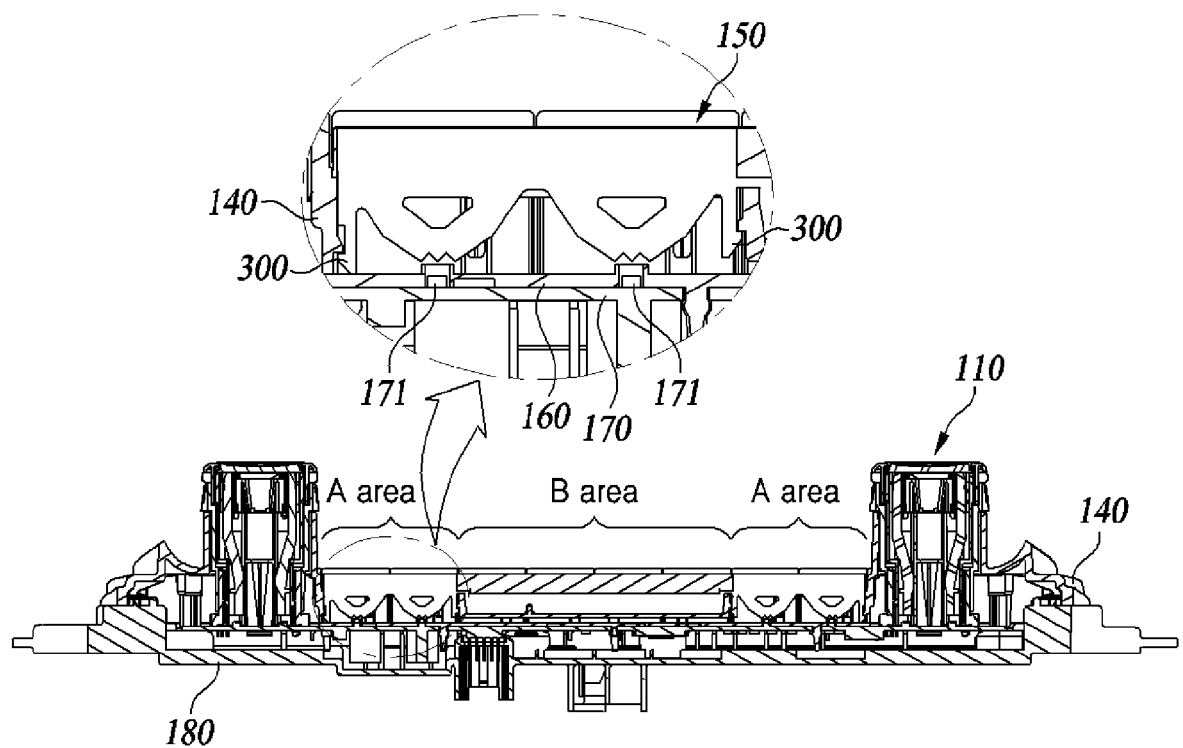
FIG. 3 is a cross-sectional view taken along line A-A of FIG. 1.

FIG. 3 is a cross-sectional view taken along line A-A of FIG. 1.

Referring to FIGS. 2 and 3, the light guide member 150 has an illuminated area (A area) and a non-illuminated area (B area). The light guide member 150 may be coupled between the button knobs 110 disposed at both ends.

The transmission member 151 includes an engaging portion 300 so that the light guide member 150 may be fixed to the front panel 140. The engaging portion 300 is formed at the rear of the transmission member 151. There may be a plurality of engaging portions 300 having a hook shape. The light guide member 150 may be coupled to an accommodating space of the front panel 140 based on the engaging portion 300 of the transmission member 151.

Light emitted from the plurality of lighting sources 171 is emitted to the front of the front panel 140 via the transmission member 151. Here, the non-illuminated area (B area) in which the shielding member 152 is formed shields light emitted from the illuminated area (A area). In other words, the non-illuminated area (B area) may prevent light leakage from light generated in the illuminated area (A area).

A shape and area of the transmission member 151 and the shielding member 152 of the light guide member 150 are not limited thereto. This is only an embodiment, and the light guide member 150 may be disposed in any area of the vehicle in which the illuminated area and the non-illumination area should be separated. For example, the light guide member 150 may be disposed in one or more places inside the vehicle, such as a center console, cockpit, or door.

In order to emit light from the plurality of lighting sources 171 arranged in front of the PCB 170 to the front, the transmission member 151 is injection-molded based on a highly transmissive polycarbonate material to be manufactured. However, the material of the transmission member 151 is not limited thereto. For example, the transmission member may be injection-molded using any one of acrylic (PMMA), polyethylene terephthalate (PET), polypropylene (PP), polyurethane (PU), and silicone.

The shielding member 152 may shield a partial area of the light guide member 150. The shielding member 152 may be injection-molded in a partially open shape during the secondary injection molding. The open shape of the shielding member 152 forms an optical path so that light emitted from the plurality of lighting sources 171 may pass through the transmission member 151 and then be projected forwardly.

The size of the illuminated area according to an embodiment of the present disclosure may be, for example, 1 mm in vertical length and 40 mm in horizontal length. However, this is only an embodiment, and the size of the illuminated area is not limited thereto. The size of the illuminated area may be determined based on, for example, vehicle specifications and an installation position of the light guide member 150.

The shielding member 152 may be injection-molded based on, for example, any one of acrylonitrile butadiene styrene (ABS), polyvinyl chloride (PVC), and polyurethane (PU).

The shielding member 152 may be manufactured using a black material in order to shield light emitted from the plurality of lighting sources 171.

Figure 4:
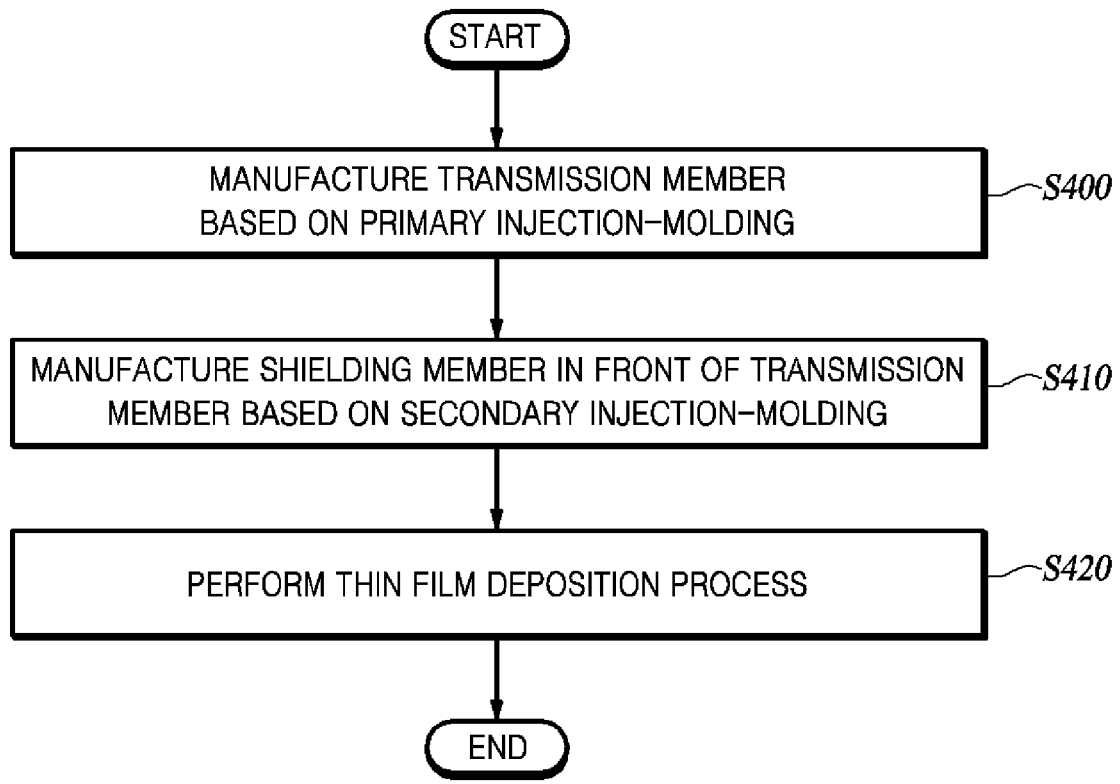
FIG. 4 is a flowchart illustrating a method of manufacturing a lighting apparatus for a vehicle according to an embodiment of the present disclosure.

FIG. 4 is a flowchart illustrating a method of manufacturing a lighting apparatus for a vehicle according to an embodiment of the present disclosure.

Referring to FIGS. 1 and 4, the transmission member 151 is manufactured based on primary injection molding (S400). The transmission member 151 may be injection-molded using a transparent material.

The shielding member 152 is manufactured in front of the transmission member 151 based on secondary injection molding (S410). Based on double-injection molding, the shielding member 152 may be injection-molded in front of the transmission member 151. The shielding member 152 may be injection-molded using a black material to prevent light from transmitting.

A thin film deposition process is performed (S420). After the transmission member 151 and the shielding member 152 are manufactured based on double-injection molding, the thin film deposition process may be performed on the shielding member 152. The shielding member 152 is disposed to be exposed to the front between the plurality of first buttons 120 and the plurality of second buttons 130. Accordingly, a chromium metal may be deposited on the shielding member 152 so that the glossy surface formed of a metal material is expressed during the day, and the illuminated area and the non-illuminated area may be distinguished from each other at night. The thin film deposition process according to an embodiment of the present disclosure may include a physical vapor deposition (PVD) process.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A lighting apparatus for a vehicle, the lighting apparatus comprising:
    a rear panel;
    a printed circuit board (PCB) disposed in front of the rear panel and including a plurality of lighting sources;
    a rubber pad disposed in front of the PCB and having a plurality of through-holes arranged based on positions of the plurality of lighting sources;
    a front panel snap-fitted to the rear panel; and
    a light guide member coupled to an accommodating space between a plurality of first buttons and a plurality of second buttons disposed on the front panel,
    wherein the light guide member includes a transmission member through which light emitted from the plurality of lighting sources transmits and a shielding member shielding the light,
    wherein the transmission member includes a plurality of engaging portions protruding backwardly to be coupled to the accommodating space,
    wherein the plurality of engaging portions have a hook shape to be snap-fitted into the accommodating space, and
    wherein the transmission member has a shape with a predetermined thickness so that the transmission member is disposed between the plurality of first buttons and the plurality of second buttons.

2. The lighting apparatus of claim 1, wherein the light guide member is manufactured using double-injection molding.

3. The lighting apparatus of claim 1, wherein the shielding member is configured to have an open area to expose a partial area of the transmission member to the front.

4. The lighting apparatus of claim 1, wherein the transmission member includes a material that transmits the light emitted from the plurality of lighting sources.

5. The lighting apparatus of claim 4, wherein the material of the transmission member includes one of polycarbonate (PC), acrylic (PMMA), polyethylene terephthalate (PET), polypropylene (PP), polyurethane (PU), and silicone.

6. The lighting apparatus of claim 1, wherein the shielding member includes a material that blocks the light emitted from the plurality of lighting sources.

7. The lighting apparatus of claim 6, wherein the material of the shielding member includes one of acrylonitrile butadiene styrene (ABS), polyvinyl chloride (PVC), and polyurethane (PU).

8. The lighting apparatus of claim 1, further comprising:
    a thin film disposed on the light guide member.

9. The lighting apparatus of claim 1, wherein the thin film includes chrome.

* * * * *